US012709399B2

(12) United States Patent
Durocher et al.

(10) Patent No.: US 12,709,399 B2
(45) Date of Patent: Aug. 18, 2026

(54) HYBRID AIRCRAFT POWER PLANT AND METHOD OF OPERATION

(71) Applicant: PRATT & WHITNEY CANADA CORP., Longueuil (CA)

(72) Inventors: Eric S. Durocher, Boucherville (CA); Roberto Brito, Beloeil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/432,942

(22) Filed: Feb. 5, 2024

(65) Prior Publication Data

US 2025/0250015 A1 Aug. 7, 2025

(51) Int. Cl.

| | |
|---|---|
| ***B64D 27/33*** | (2024.01) |
| ***B64C 11/30*** | (2006.01) |
| ***B64D 35/022*** | (2024.01) |
| ***B64D 35/08*** | (2006.01) |
| ***F02C 7/06*** | (2006.01) |
| ***F02C 7/32*** | (2006.01) |

(52) U.S. Cl.
CPC .............. *B64D 27/33* (2024.01); *B64C 11/30* (2013.01); *B64D 35/022* (2024.01); *B64D 35/08* (2013.01); *F02C 7/06* (2013.01); *F02C 7/32* (2013.01)

(58) Field of Classification Search
CPC .... B64D 27/33; B64D 35/022; B64D 35/023; B64D 35/025; B64D 35/026; B64D 35/08; F02C 7/32; F02C 7/36; F02C 7/06
See application file for complete search history.

(56) References Cited

U.S. PATENT DOCUMENTS

| | | | | |
|---|---|---|---|---|
| 2,284,473 | A * | 5/1942 | Menasco | B64D 35/08 244/102 R |
| 10,329,955 | B2 | 6/2019 | Menheere et al. | |
| 11,186,378 | B2 | 11/2021 | Dubreuil et al. | |
| 11,846,198 | B2 | 12/2023 | Vive et al. | |
| 2005/0135929 | A1* | 6/2005 | Waddleton | B64C 11/38 416/1 |
| 2014/0150440 | A1* | 6/2014 | Suciu | F02C 7/236 60/726 |
| 2015/0121893 | A1* | 5/2015 | Kupratis | F04D 25/045 60/774 |
| 2016/0341074 | A1* | 11/2016 | Fang | F01D 25/18 |
| 2017/0211477 | A1* | 7/2017 | Menheere | F02C 7/32 |
| 2020/0277075 | A1 | 9/2020 | Dubreuil et al. | |
| 2021/0039802 | A1* | 2/2021 | Chesneau | F01D 15/10 |
| 2021/0108568 | A1* | 4/2021 | Caimano | F02C 7/32 |
| 2022/0033097 | A1 | 2/2022 | Botti et al. | |
| 2023/0417180 | A1 | 12/2023 | Klonowski et al. | |

FOREIGN PATENT DOCUMENTS

| | | | |
|---|---|---|---|
| WO | 2023012435 | A1 | 2/2023 |

* cited by examiner

*Primary Examiner* — Thomas P Burke

(74) *Attorney, Agent, or Firm* — Norton rose fulbright Canada LLP

(57) ABSTRACT

The hybrid aircraft power plant can have a load, a thermal engine coupled to drive the load via a clutch, and coupled to drive a first lubricant pump, an electric motor coupled to drive the load and a second lubricant pump. In a first mode, the clutch is in an engaged configuration, and the thermal engine drives the load via the clutch and drives the first lubricant pump. In a second mode, in which the clutch is in the disengaged configuration and in which the thermal engine may be inoperative, the electric motor is operated to drive the load and the second lubricant pump.

7 Claims, 5 Drawing Sheets

AUXILIARY GEARBOX
146
LUBRICANT PUMP
142
THERMAL ENGINE
118
122
REDUCTION GEARING
140
GEAR TRAIN
138
136
CLUTCH
ELECTRIC MOTOR
120
148
PCU
124
110
112
SECOND LUBRICANT PUMP
144
116
114

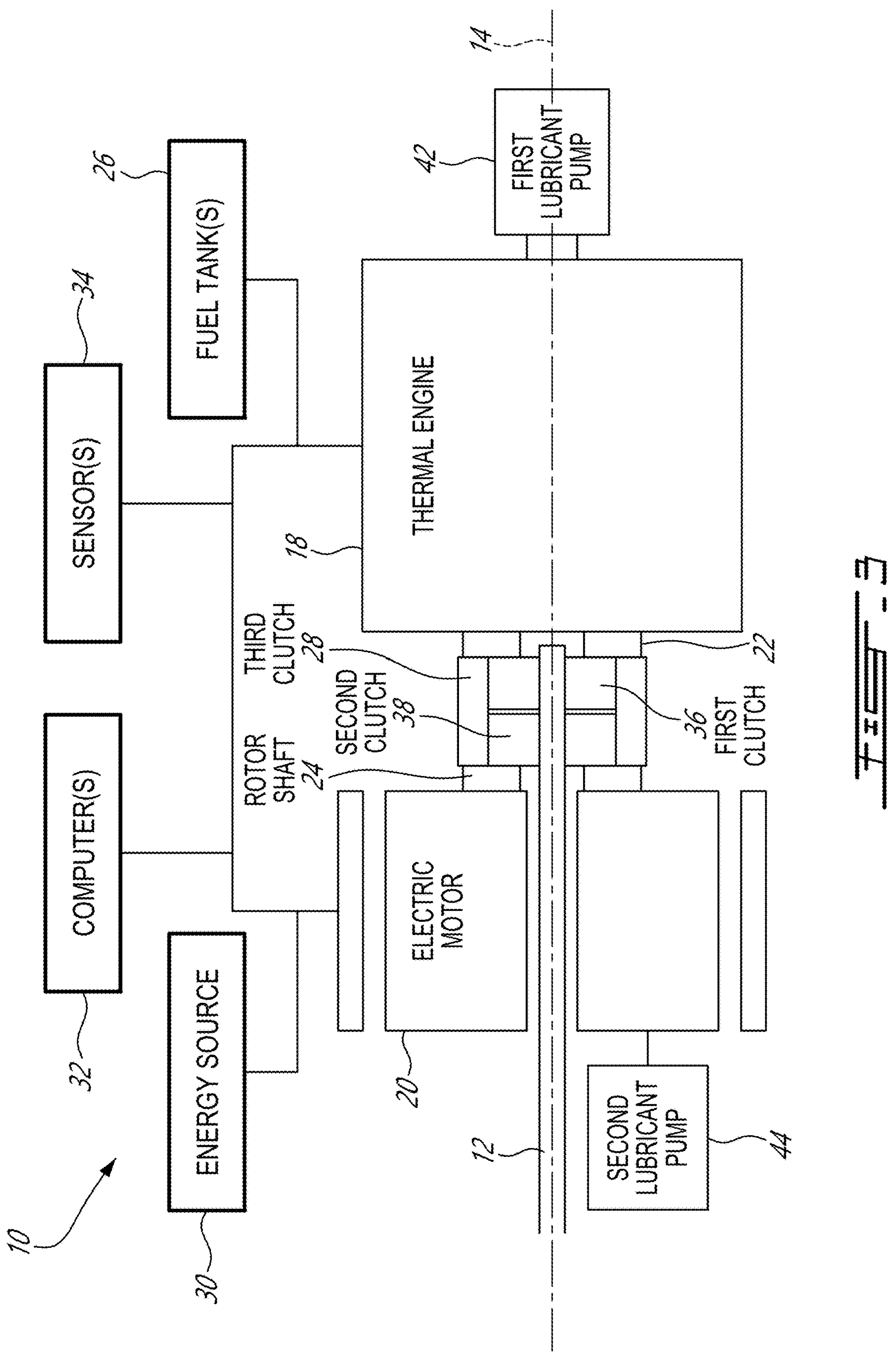
10
12
14
FIRST LUBRICANT PUMP
42
FUEL TANK(S)
26
SENSOR(S)
34
THERMAL ENGINE
18
THIRD CLUTCH 28
SECOND CLUTCH 38
ROTOR SHAFT 24
22
36
FIRST CLUTCH
COMPUTER(S)
32
ENERGY SOURCE
30
ELECTRIC MOTOR
20
SECOND LUBRICANT PUMP
44

HYBRID AIRCRAFT POWER PLANT AND METHOD OF OPERATION

TECHNICAL FIELD

The application relates generally to hybrid aircraft power plants and, more particularly, to architectures thereof.

BACKGROUND OF THE ART

Hybrid aircraft power plants that include a thermal engine and an electric motor for propelling aircraft can provide operational advantages. However, there are several challenges along the path to fully harnessing this potential. For instance, hybrid aircraft powerplants may benefit from having means to allow either one, or both, of the electric motor or the thermal engine to operate independently from the other in some operation modes, and simultaneously in other modes of operation. While there may be different ways of satisfying such needs, power plant design factors in various considerations, such as limiting production cost and maintenance costs, which may benefit from a design having a lower number of different parts. Moreover, in the case of aircraft applications, there is a concern for increased reliability and weight reduction than in ground-based applications. Such considerations complexify the puzzle of optimizing hybrid power plant architecture for the designers.

SUMMARY

In one aspect, there is provided a method of operating a hybrid aircraft power plant having a thermal engine coupled to a load via a clutch, a first lubricant pump coupled to the thermal engine, an electric engine coupled to the load, and a second lubricant pump coupled to the electric motor, the method comprising: operating the hybrid aircraft power plant in a first mode of operation in which the clutch is in an engaged configuration, including operating the thermal engine to drive the load via the clutch and to drive the first lubricant pump; changing the configuration of the clutch between the engaged configuration and a disengaged configuration, the thermal engine being decoupled from the load when the clutch is in the disengaged configuration; and operating the hybrid aircraft power plant in a second mode of operation in which the clutch is in the disengaged configuration, including operating the electric motor to drive the load and to drive the second lubricant pump.

In another aspect, there is provided a hybrid aircraft power plant comprising: a load; a first lubricant pump; a second lubricant pump; a thermal engine coupled to drive the load via a clutch, the thermal engine further coupled to drive the first lubricant pump; an electric motor coupled to drive the load, the electric motor further coupled to drive the second lubricant pump; and a lubricant circuit fluidly connecting the first lubricant pump and the second lubricant pump to supply lubricant to the electric motor and to the thermal engine.

DESCRIPTION OF THE DRAWINGS

Reference is now made to the accompanying figures in which:

FIG. 3 is a schematic cross-sectional view of an other example of a hybrid aircraft power plant.

DETAILED DESCRIPTION

In this specification, the term "connected" may include both direct connection (in which two elements that are connected to each other contact each other) and indirect connection (in which at least one additional element is located between the two elements) unless the expression "direct" is specifically used to identify a direct connection. Similarly, the terms "coupled" and "engaged" may include both direct coupling or engagement (in which two elements that are coupled to each other contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Figure 1:
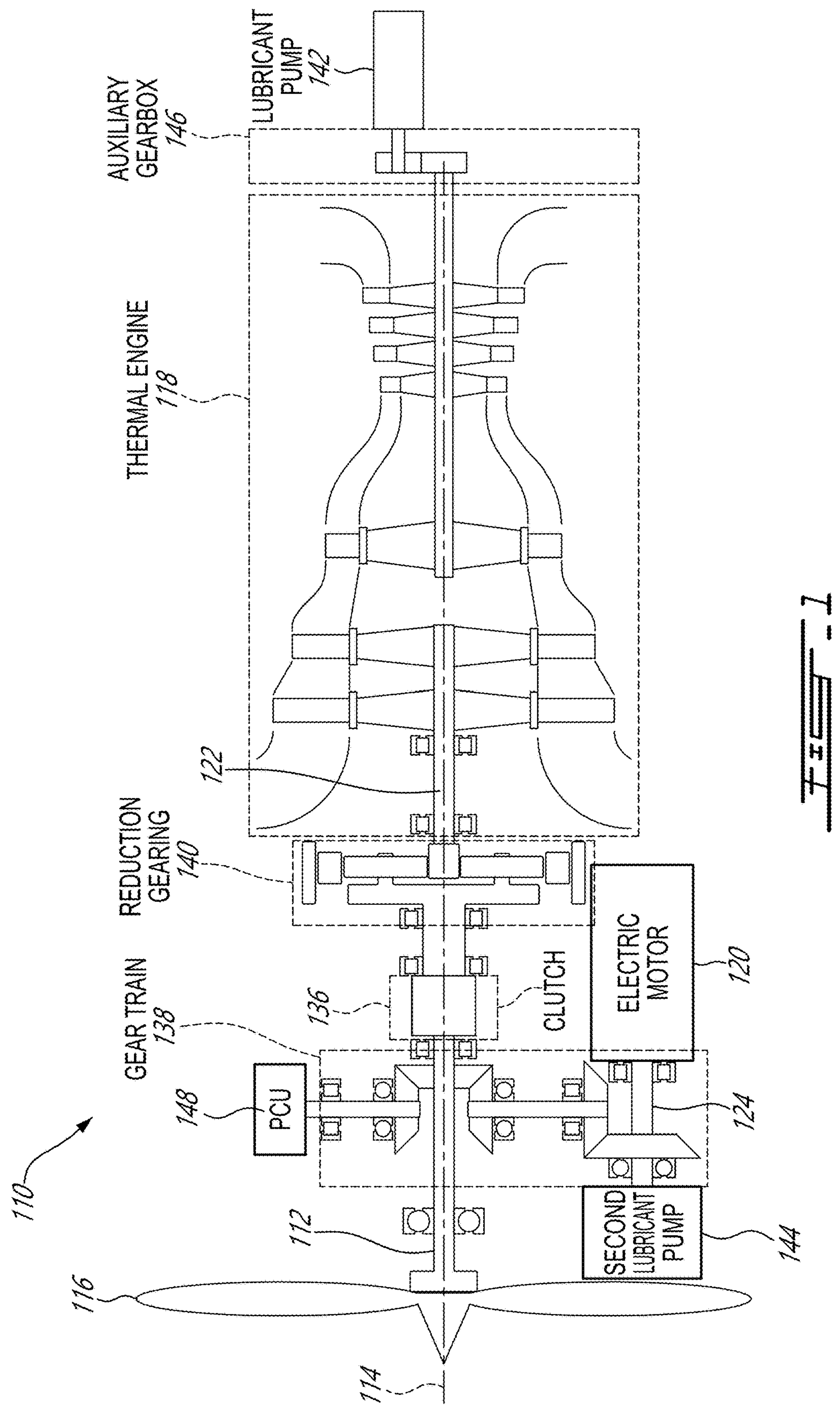
FIG. 1 is a schematic cross-sectional view of a hybrid aircraft power plant.

FIG. 1 is a schematic illustration of an exemplary configuration of power plant 110 being drivingly connected to propeller 116. The propeller 116 is non-limiting example of a suitable air mover or load. In this example, the power plant 110 is drivingly connected to propeller 116 via an output shaft 112. The output shaft 112 rotates about an axis 114. Propeller 116 may be a variable pitch propeller. Power plant 110 may include one or more thermal engines 118 (referred hereinafter in the singular) and one or more electric motors 120 (referred hereinafter in the singular). In an embodiment of power plant 110, the thermal engine 118 is coupled to the output shaft 112 via a clutch 136, and the electric motor 120 may thus be selectively operable to drive the propeller 116 independently from the thermal engine 118. More specifically, in the example presented in FIG. 1, the thermal engine 118 has a thermal engine shaft 122, and the electric motor 120 has a rotor shaft 124.

More specifically, the clutch 136 can be in an engaged configuration, in which it mechanically couples the thermal engine 118 to the propeller 116, or in a disengaged configuration, which disengages the thermal engine 118 from the propeller 116. The switch from one configuration to the other may be automatic or passive, e.g., via using an overrunning clutch, or active, e.g., via the control of an actuator. A passive clutch may be preferred in some embodiments. When the thermal engine 118 is disengaged from the propeller 116, the thermal engine can be shut down/inoperative, and the propeller 116 may nonetheless be driven by the electric motor 120. The electric motor 120 may be coupled to the output shaft 112 via a geartrain 138. The thermal engine 118 may be coupled to a first lubricant pump 142. The electric motor 120 may be coupled to a second lubricant pump 144.

It will be noted in the specific embodiment illustrated, the thermal engine 118 is a gas turbine engine, the thermal engine shaft 122 is coupled to the clutch 136 via reduction gearing 140, and the thermal engine 118 is coupled to the first lubricant pump 142 via an auxiliary gearbox 146. The expression gearbox may be used herein to refer to a housing which encloses gearing, and thus encloses lubricant which may be used to lubricate the enclosed gearing during operation. The housing may be considered to form part of the lubricant circuit. Gearing is typically housed in a housing and thus embodied in the form of a gearbox. Reduction gearing is optional and may not be present, for instance, in an embodiment where the thermal engine is a piston or Wankel engine, or in an embodiment where the load is not a propeller. In this embodiment, the propeller 116 is a variable pitch propeller, and the power plant 110 further has a propeller control unit, PCU 148, operable to change the pitch of the blades of propeller 116. The PCU 148 is coupled to the output shaft 112 by the gearing 138 and driven by the output shaft 112.

Figure 2A:
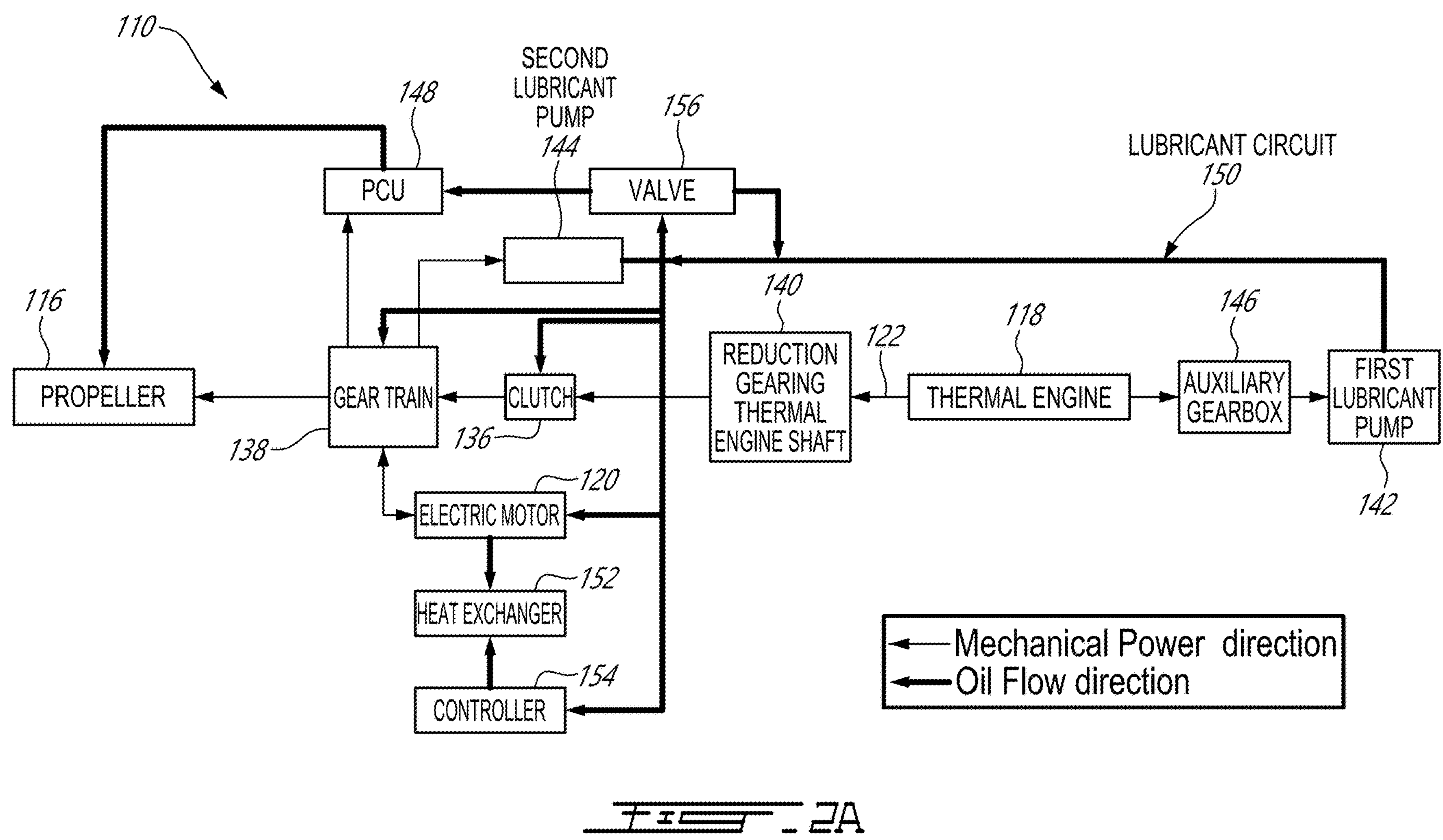
FIGS. 2A and 2B are schematic views of a lubricant circuit of the hybrid aircraft power plant of FIG. 1, showing a first mode of operation and a second mode of operation, respectively.
Figure 2B:
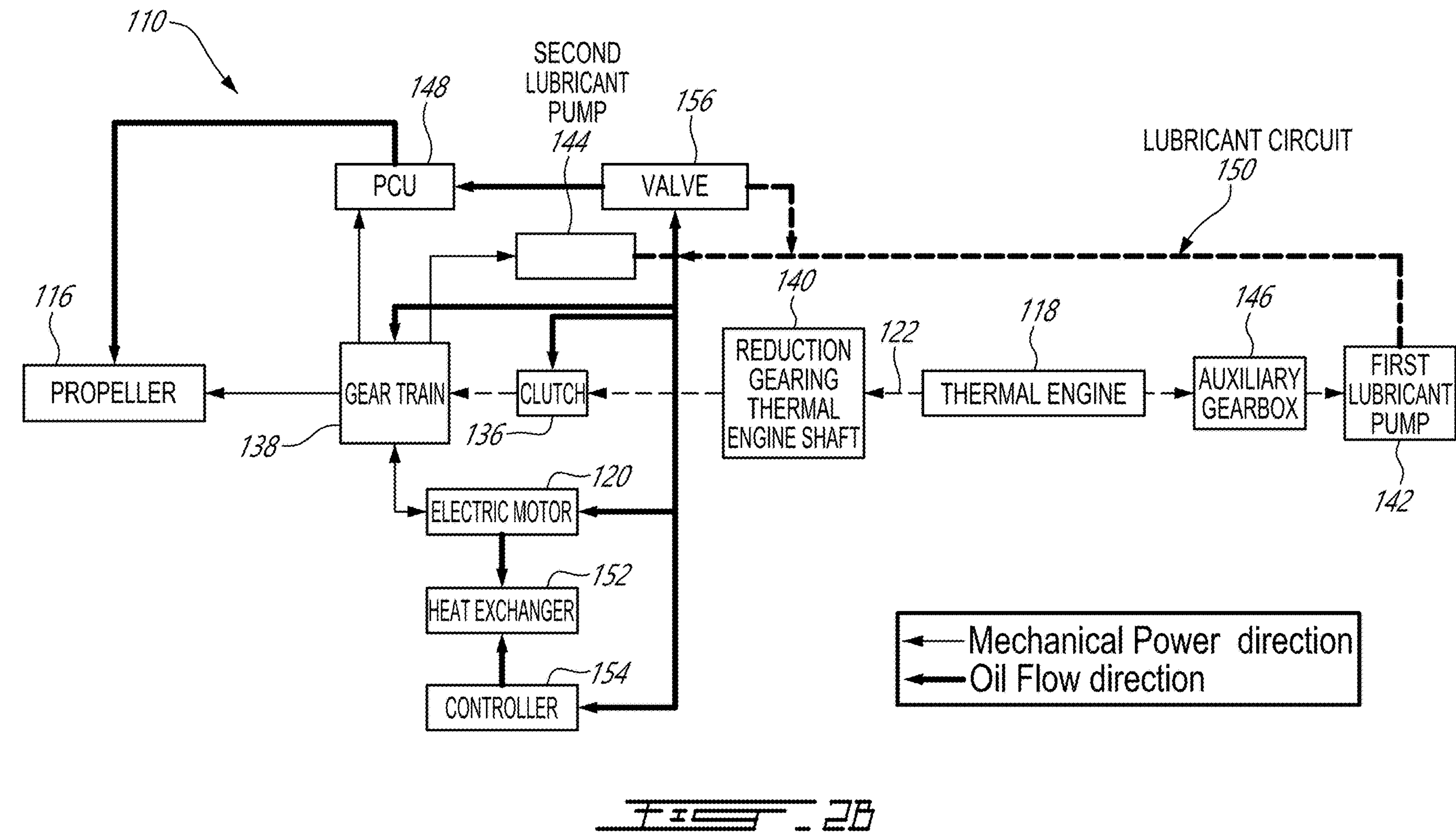

Turning to the schematic view presented in FIGS. 2A and 2B, a lubricant circuit 150 is provided in association with the first lubricant pump 142 and the second lubricant pump 144. While the lubricant circuit 150 is schematically shown, it will be understood that in practice it can include a plurality of conduits, and potentially one or more filter and/or one or more air/oil separator. The plurality of conduits may form a network of lubricant passages which extend continuously within the lubricant circuit, or which may be segmented by one or more valve. Lubricant circuit 150 may fluidly connect an outlet of the first lubricant pump 142 and an outlet of the second lubricant pump 144 to one or more components of power plant 110 which may need lubricant (either for lubrication, for cooling, or both; some lubricants which are more efficient in cooling being sometimes referred to as coolants) during operation. Such components may include components more closely associated to the operation of the thermal engine 118 such as components of the thermal engine itself (e.g., bearings supporting rotor elements) and gearing such as reduction gearbox 140 and/or auxiliary gearbox 146. Such components may include components more closely associated to the operation of the electric motor 120 such as components of the electric motor 120 itself, a heat exchanger 152, an inverter and/or controller 154. Such components may include components more generally associated to the operation of the power plant 110 such as clutch 136, gearing 138, PCU 148 and/or one or more other hydraulic actuator (actuators which operate based on lubricant pressure).

The power plant 110 may be selectively controlled to operate in either one of more than one mode of operation. Depending on the mode of operation, lubricant may circulate selectively in only some of the conduits of lubricant circuit, not circulating in others, and the conduits in which lubricant circulates or not may depend on the mode of operation. In an example embodiment, a first mode of operation is presented in FIG. 2A, and a second mode of operation is presented in FIG. 2B.

In the first mode of operation, presented in FIG. 2A, the clutch 136 is in the engaged configuration, and the thermal engine 118 is operated to drive the propeller 116 via the clutch 136. The thermal engine 118 simultaneously drives the first pump 142 via the auxiliary gearbox 146. The first lubricant pump 142 therefore generates an increase in pressure in the lubricant circulating across it, driving the circulation of lubricant in the conduits of the lubricant circuit 150. The conduits of the lubricant circuit 150 may distribute the lubricant to components associated to the operation of the thermal engine 118, including bearings of thermal engine 118, reduction gearbox 140, and auxiliary gearbox 146. The conduits of the lubricant circuit may distribute the lubricant to components more closely associated to the operation of the electric motor 120 such as bearings of or cooling passages of the electric motor 120 itself, a heat exchanger 152, an inverter and/or controller 154. The conduits of the lubricant circuit 150 may distribute the lubricant to components more generally associated to the operation of the power plant 110 such as clutch 136, gearing 138, PCU 148. In the first mode of operation, the second lubricant pump 144 may or may not be mechanically driven, depending on the embodiment.

In the illustrated embodiment, the second lubricant pump 144 is directly connected to the geartrain 138 and is thus driven whenever the output shaft 112 is driven, and therefore, in this embodiment, the second lubricant pump 144 contributes to increasing the lubricant pressure in the lubricant circuit 150 in the first mode of operation. In such a mode of operation, the combination of the first lubricant pump 142 and of the second lubricant pump 144 may thus be over-designed, and lead to an oil pressure which is too high for one or more pressure-sensitive components. This can be the case for the PCU 148 for instance, which may constitute a pressure-sensitive component. In such cases, a pressure regulation valve such as valve 156 may be provided upstream of such a sensitive component and limit the lubricant pressure provided to the sensitive component. This may involve recirculating a portion of the flow of lubricant associated to the excessive pressure back into the remainder of the lubricant circuit, thus maintaining the lubricant pressure in a conduit extending between the valve and the pressure sensitive component below a threshold set by the valve, for instance. For many components of power plant 110, lubricant pressure higher than the required minimum lubricant pressure may not need to be specifically addressed by pressure regulation.

In the first general mode of operation, three sub-modes of operation are possible. More specifically, the electric motor 120 may either be operated i) in motor mode to output power, e.g., collaborate with the thermal engine 118 in driving the propeller, ii) in generator mode to receive power from the thermal engine 118 or propeller 116 and convert it into electrical energy to be stored in a battery or used to supply electric power to aircraft electrical systems, or iii) in freewheel mode in which it neither generates power nor receives power. The motor mode may be useful at takeoff or climbing for instance. The generator mode may be useful during descent for instance. The freewheel mode may be useful when cruising for instance.

When the clutch 136 is a passive clutch, the first mode of operation may occur whenever the power or torque generated on output shaft 112, by the electric motor 120 and/or possibly propeller 116 in the case of windmilling, is less than the power or torque generated by the thermal engine 118, and the clutch 136 may switch from the engaged configuration to the disengaged configuration when the power or torque generated on the output shaft 112 is greater than the power or torque generated by the thermal engine 118. When the clutch 136 is an active clutch, the switching of the clutch 136 from the engaged configuration to the disengaged configuration may be actively controlled.

In the second mode of operation, presented in FIG. 2B, the clutch 136 is in the disengaged configuration and the thermal engine does not contribute to mechanically driving the output shaft 112 nor the gearing 138. The thermal engine 118 may be maintained in an inoperative state, e.g., not driven in rotation and not consuming any fuel, in which case the first lubricant pump 142 may also be inoperative and therefore not contribute to the lubricant pressure or circulation in lubricant circuit 150. Accordingly, no lubricant circulation may be present in conduits of the lubricant circuit 150 which lead to and from the first lubricant pump 142, which is schematized by dashed lines. The electric motor 120 may be operated to drive the output shaft 112, and thus the propeller 116 (or other load), via the gearing 138.

Accordingly, the second pump 144 may be driven by the electric motor, and optionally by propeller 116 in the case of windmilling. The power of the second pump 144 may be significantly lower than the combined power of the first pump 142 and of the second pump 144, which may yet be sufficient in a context where, when the thermal engine 118 is inoperative, components specifically associated to the thermal engine operation, such as bearings of thermal engine 118, reduction gearbox 140, and auxiliary gearbox 146, may not need to be lubricated, reducing the overall lubricant pump power requirement in the second mode of operation compared to the first mode of operation. Other components, including potentially components specifically associated to the electric motor 120 and/or components not specifically associated to the electric motor, may nonetheless need to be lubricated. For example, in the second mode of operation, the conduits of the lubricant circuit 150 may distribute the lubricant to components more closely associated to the operation of the electric motor 120 including the electric motor 120 itself, a heat exchanger 152, an inverter and/or controller 154, and the conduits of the lubricant circuit may distribute the lubricant to components more generally associated to the operation of the power plant 110 such as clutch 136, gearing 138, PCU 148. During this time during which lubricant circulates in some conduits of the lubricant circuit 150, lubricant may not circulate in those conduits of the lubricant circuit 150 which extend specifically to and back from the first lubricant pump 142.

The second mode of operation can be useful in situations where operation of the electric motor 120 only are desired, i.e., when operation of the thermal engine 118 is not required or desired. Such a situation may occur when taxiing an aircraft, to name one example. Indeed, there may be many benefits to operating the power plant 110 in the second mode of operation when taxiing the aircraft since taxiing is typically portion of the mission in which the power requirement at the output shaft 112 is relatively low, and where noise reduction may be beneficial (particularly when the airport is close to a residential area). Operation of the electric motor 120 may be significantly less noisy than operation of the thermal engine 118.

In the first mode of operation, both the first pump and the second pump may contribute to the total lubricant pressure in the lubricant circuit. When the clutch changes from the engaged configuration to the disengaged configuration, recirculation of fluid by the valve may be interrupted. The valve may be a pressure regulated valve. the recirculation may occur in a recirculation conduit or passage. A pressure-sensitive component such as a propeller control unit may have a lubricant pressure requirement.

Various different embodiments are possible. Indeed, the configuration presented in FIG. 1 is an example of a parallel drivetrain configuration in which the thermal engine shaft 122 is coaxial with the output shaft 112 and the reduction gearing 140 is epicyclic gearing. The clutch 136 is disposed coaxially to the thermal engine 118. The rotor shaft 124, while parallel to the output shaft 112, is offset from the output shaft 112, and the gearing 138 can be referred to as a parallel geartrain. In this embodiment, the rotor shaft 124 is not coaxial to the output shaft 112, but offset from axis 114. The rotor shaft 124 is connected to the output shaft 112 via a geartrain 138 which may or may not include reduction. Such a parallel drivetrain configuration may be useful in some embodiments to avoid significant increase in the axial length of the power plant by the introduction of electric motor 120 compared to the case where the electric motor 120 is absent and the only source of power is the thermal engine 118, for instance.

In the embodiment presented in FIG. 1, the electric motor 120 is directly coupled to the parallel geartrain. In other words, there is no clutch between the electric motor 120 and the output shaft 112. A safety disengagement feature may nonetheless be integrated to the electric motor 120 itself whereby the electric motor 120 may disengage from the parallel geartrain in the event of surcharge, overtorque, bearing seizure, etc., in which case the load may continue to be driven by the thermal engine 118. it will be noted in the embodiment presented in FIG. 1 that an intermediary shaft connects the rotor shaft 124 to the output shaft 112, and that the intermediary shaft is transversal to the parallel axes of the rotor shaft 124 and of the output shaft 112. Here, the second lubricant pump 144 is shown coupled to the rotor shaft 124 though it will be understood that in an alternate embodiment the second lubricant pump 144 may be coupled to the intermediary shaft for instance.

FIG. 3 is a schematic illustration of an other exemplary configuration of a power plant 10 which can be said to be of an in-line gearing configuration. The power plant 10 is drivingly connectable to a load (not shown) via an output shaft 12. The output shaft 12 rotates about an axis 14. Power plant 10 may include one or more thermal engines 18 (referred hereinafter in the singular) and one or more electric motors 20 (referred hereinafter in the singular). In an embodiment of power plant 10, thermal engine 18 and electric motor 20 may be arranged in parallel and each be selectively operable to drive the propeller 16 or not independently from the other. More specifically, in the example presented in FIG. 1, the thermal engine 18 has a thermal engine shaft 22, and the electric motor 20 has a rotor shaft 24. A first clutch 36 is operable to engage (or disengage) the thermal engine shaft 22 with (or from) the output shaft 12, and a second clutch 38 is operable to engage (or disengage) the rotor shaft 24 with (or from) the output shaft 12. The second clutch 38 can operate independently of the first clutch 36. A third clutch 28 can be used to selectively engage (or disengage) the rotor shaft 24 to (or from) the thermal engine shaft 22.

It will be noted in this embodiment that the thermal engine shaft 22 is coaxial with the output shaft 12 and with the rotor shaft 24. The first clutch 36 and the second clutch 36 are disposed axially between the electric motor 20 and the thermal engine 18, relative the axis. In this exemplary configuration, the electric motor 20 surrounds the output shaft 12 and axially overlaps with the output shaft 12. The output shaft 12 has two opposite ends which axially protrude from the electric motor 20 including a first end connected to the propeller 16 and a second end connected to the first clutch 36 and second clutch 38. The first end and the second end are on opposite sides of the electric motor 20 along the axis 14.

The electric motor can be used as a starter when the thermal engine is stopped. In this embodiment, the output shaft 12 extends axially across the electric motor 20. This configuration can be beneficial in exposing the electric motor 20 at the front of the aircraft, to the airflow generated at the propeller or other air mover, which may be useful in cooling the electric motor 20 during operation, for instance.

An embodiment such as presented in FIG. 3 can be referred to as an in-line gearing configuration. The in-line gearing configuration may alloy a more compact and minimum frontal area beneficial for aero engine. For failure scenarios, sprag clutches can allow to decouple the thermal engine or electric motor when stopped allowing the other engine to continue.

In an embodiment such as presented in FIG. 3, a first oil pump 42 may be coupled to the thermal engine 18, and a second oil pump 44 may be coupled to the electric motor 20. An oil circuit may otherwise be generally as presented in FIG. 2A, for instance.

Thermal engine 18 may include a (e.g., continuous or intermittent) internal combustion engine. In various embodiments, thermal engine 18 may include a gas turbine engine, a rotary (e.g., Wankel) engine or a piston engine for example. Thermal engine 18 may generate first torque at thermal engine shaft 22 from the controlled combustion of a suitable fuel stored in fuel tank 26 and supplied to thermal engine 18.

In various embodiments, electric motor 20 may be a permanent magnet synchronous motor, a brushless direct-current (DC) electric motor, or an alternating-current (AC) motor for example. Electric motor 20 may generate torque at the rotor shaft 24 via the conversion of electric energy received from energy source 30. Energy source 30 may be a direct current (DC) electric source used to drive motor 20 via suitable power electronics (e.g., inverter) and motor controller. Energy source 30 may alternately or additionally have an alternating current (AC) electric source. Energy source 30 may include one or more batteries (e.g., battery bank) or supercapacitors for example. Energy source 30 may include one or more lithium-ion batteries, one or more nickel-metal hydride batteries and/or one or more lead-acid batteries to name some potential examples.

In some embodiments, energy source 30 may be rechargeable or otherwise have one or more rechargeable elements. For example, the operation of electric motor 20 as an electric generator may be used to recharge energy source 30 in some situations. In some embodiments, electric motor 20 may be used as a starter for the thermal engine 18.

In some embodiments, power plant 10 may be operated to manage the state-of-charge (SOC) of energy source 30 by the selective operation of electric motor 20 as a motor to draw energy from energy source 30 or as a generator to input energy into energy source 30. Alternatively or in addition, energy source 30 may be recharged using a ground-based source of electric power when aircraft is on ground, such as an AC power supply.

In various embodiments, thermal engine 18 and electric motor 20 may be controlled by one or more controllers implemented by one or more computer(s) 32 (referred hereinafter in the singular). In some embodiments, thermal engine 18 and electric motor 20 may be operated either together or separately to drive the propeller 16. In some embodiments, the operation of thermal engine 18 and/or electric motor 20 may be selected based on a phase of flight of aircraft and/or based on an action (e.g., maneuver) to be executed by aircraft. For example, in a phase of flight having a high power requirement, such as during a takeoff phase or a climb phase maneuver of aircraft, both thermal engine 18 and electric motor 20 may be used to cooperatively drive the propeller 16. In a leveled cruise phase of flight, only thermal engine 18 may be used to drive the propeller 16. During taxiing, i.e., the moving of the aircraft on the ground, at the airport, only electric motor 20 may be used to drive the propeller 16.

Computer 32 may be operatively connected to control the operation of thermal engine 18 and output power from thermal engine 18 in part by controlling a fuel flow from fuel tank 26 to thermal engine 18 via a suitable fuel metering unit for example. Computer 32 may be operatively connected to control the operation of motor 20 and output power from thermal engine 18 in part by controlling a delivery of electric current from energy source 30 to thermal engine 18 via suitable power electronics for example.

Power plant 10 may include one or more sensors 34 operatively connected to energy source 30, electric motor 20, thermal engine 18, fuel tank 26, and/or to computer 32. In some embodiments, computer 32 may receive signals indicative of one or more parameters of energy source 30, electric motor 20, thermal engine 18 and/or fuel tank 26, via sensor(s) 34. The signals may be used by computer 32 to control the operation of electric motor 20, thermal engine 18, and/or assess a state of energy source 30, to name some examples. For example, sensor(s) 34 may include one or more voltage sensors, one or more current sensors, one or more torque sensor, one or more rotation speed sensor, and/or one or more temperature sensors.

Computer 32 may also receive inputs from the flight crew commanding the operation of power plant 10. Such inputs may be received from input devices actuatable by the flight crew and may include one or more buttons, switches and/or levers for example. In some embodiments, such input devices may include a throttle input device such as a throttle lever, which may also be referred to as a thrust lever or a power lever depending on the configuration of power plant 10. Throttle lever may be pivotable by the flight crew so that a throttle lever angle (TLA) may be indicative of a desired output power to be generated by power plant 10 and propeller 16. Computer 32 may control the thermal engine 18 and/or the motor 20 according to the TLA, and based on values measured via the sensors 34, so that a desired amount of thrust may be produced via the propeller 16.

In the exemplary embodiment presented in FIG. 3, the first clutch 36 directly connects the thermal engine shaft 22 to the output shaft 12, and the second clutch 38 directly connects the rotor shaft 24 to the output shaft. In an alternate embodiment, a reduction gearing may be present between the thermal engine shaft 22 and the first clutch 36, between the rotor shaft 24 and the second clutch 38, or both.

The third clutch 28 may be an active clutch such as a friction clutch or a dog clutch. An active clutch may allow selective control over the engagement and disengagement, via a controller which may include a computer 32, either based on user input and/or a control scheme which may be in the form of computer readable instructions stored in a non-transitory memory of computer 32.

The clutch 136, the first clutch 36, and the second clutch 38 may be passive, one-way, clutches, i.e., overrunning (freewheel) clutches which disengage automatically when the output shaft 12, 112 rotates faster than the respective one of the thermal engine shaft 22, 122 and the rotor shaft 24, 124. One potential advantage of overrunning clutches it that they do not need to be actively controlled, and therefore may avoid the necessity of using certain sensors, actuators, and/or control schemes. Overrunning clutches may also be mechanically simpler, more reliable, and/or have lower weight and volume than other types of clutches. There are different types of overrunning clutches, including sprag clutches, roller ramp clutches, wrap spring clutches, and wedge styles clutches. In an embodiment, the clutch 136, the first clutch 36, and the second clutch 38 can be sprag clutches. Sprag clutches may offer the feature of being relatively robust, reliable and compact. In the event of sudden stoppage of the electric motor and/or of the thermal engine, the corresponding sprag clutch will disengage automatically. The electric motor 20 or the thermal engine 18, 118 may also automatically disengage when they generate less rotation speed than the other. In some cases, this automatic disengagement feature may be desired, whereas in others, it may not be desired. The third clutch 28 may be provided to avoid the individual automatic disengagement feature of either one of the electric motor 20 and thermal engine 18 in situations where it is not desired to disengage the electric motor 20 from the thermal engine 18.

In some embodiments, it may be suitable to design the power plant for the electric motor to rotate at relatively high rotation speeds, since in some cases, for a same volume and weight of electric motor, a greater power may be achieved by the electric motor if it rotates at higher speeds, potentially achieving greater power density. This may particularly be beneficial in aircraft applications. By using two different reduction gearboxes, the rotation speed of the electric motor may be optimized independently of the optimization of the rotation speed of the thermal engine.

Figure 4:
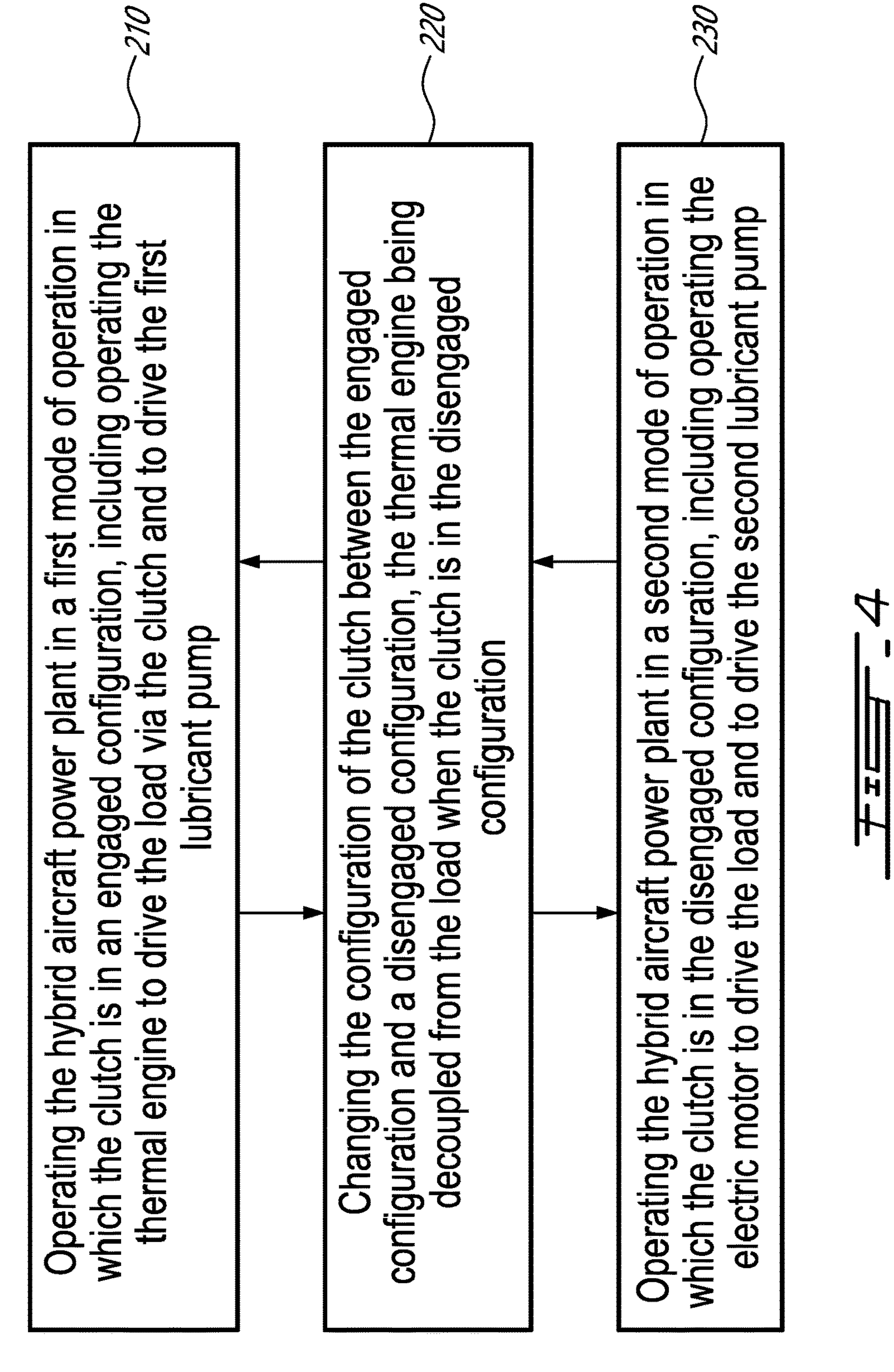
FIG. 4 is a flow chart of a method of operating a hybrid aircraft power plant.

FIG. 4 presents an example method 200 of operation of a power plant. At 210, the hybrid aircraft power plant can be operated in a first mode of operation in which the clutch is in an engaged configuration. In the first mode, the thermal engine can be operated to drive the load via the clutch and to drive the first lubricant pump.

At 220, the configuration of the clutch can be changed between the engaged configuration and a disengaged configuration, the thermal engine being decoupled from the load when the clutch is in the disengaged configuration.

At 230, the hybrid aircraft power plant can be operated in a second mode of operation in which the clutch is in the disengaged configuration, including operating the electric motor to drive the load and to drive the second lubricant pump.

The sequence of steps from 210, 220 to 230 may be performed in either order. Indeed, in a typical aircraft mission, the method 200 may be performed more than once, in both orders of the sequence. For instance, the mission may involve performing steps 210, 220, and 230 in that order, and then steps 220 and 210, or only doing the sequence of steps 230, 220 and 210 in that order.

The computer(s) 32 or computing devices of the controller may be the same or different types of devices. Note that the controller can be implemented as part of a full-authority digital engine controls (FADEC) or other similar device, including electronic engine control (EEC), engine control unit (ECU), electronic propeller control, propeller control unit, and the like. In some embodiments, the controller is implemented as a Flight Data Acquisition Storage and Transmission system, such as a FASTTM system. The controller may be implemented in part in the FASTTM system and in part in the EEC. Other embodiments may also apply.

The computer(s) 32 comprises a processing unit and a memory which has stored therein computer-executable instructions. The processing unit may comprise any suitable devices configured to implement a method such that instructions, when executed by the computer(s) or other programmable apparatus, may cause the functions/acts/steps performed to control the mode of operation of the engine to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may comprise any suitable known or other machine-readable storage medium. The memory may comprise non-transitory computer readable storage medium, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions 506 executable by processing unit.

The methods and systems for controlling the engine described herein may be implemented in a high level procedural or object oriented programming or scripting language, or a combination thereof, to communicate with or assist in the operation of a computer system, for example the computer(s). Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit of the computing device, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

While the description may present method and/or process steps as a particular sequence, it is understood that to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. As used herein, the term "about" is intended to allow for a 10% variation of the associated numerical values.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Other applications would be recognized by the person of ordinary skill in the art and are considered to be within the scope of the present disclosure. Yet further modifications could be implemented by a person of ordinary skill in the art in view of the present disclosure, which modifications would be within the scope of the present technology.

The invention claimed is:

1. A method of operating a hybrid aircraft power plant having a thermal engine coupled to a propeller via a clutch, a first lubricant pump coupled to the thermal engine, an electric motor coupled to the propeller via a geartrain, a propeller control unit (PCU) coupled to the geartrain, and a second lubricant pump coupled to the electric motor, the method comprising:

operating the hybrid aircraft power plant in a first mode of operation in which the clutch is in an engaged configuration, including operating the thermal engine to drive the propeller via the clutch and to drive the first lubricant pump and the second lubricant pump to circulate lubricant to the geartrain and to the PCU via a lubricant circuit, the first lubricant pump and the second lubricant pump both contributing to a total lubricant pressure in the lubricant circuit, the total lubricant pressure being too high for the PCU;

regulating the total lubricant pressure using a pressure regulation valve upstream of the PCU, including recirculating a portion of the lubricant upstream of the PCU, thereby limiting a lubricant pressure at the PCU and protecting the PCU from excessive pressure;

changing a configuration of the clutch between the engaged configuration and a disengaged configuration, the thermal engine being decoupled from the propeller when the clutch is in the disengaged configuration; and operating the hybrid aircraft power plant in a second mode of operation in which the clutch is in the disengaged configuration, including operating the electric motor to drive the propeller and to drive the second lubricant pump to circulate the lubricant to the geartrain and to the PCU.

2. The method of claim 1, wherein said changing the configuration of the clutch includes interrupting said recirculating.

3. The method of claim 1, wherein the first mode further includes freewheeling the electric motor.

4. The method of claim 1, wherein the second mode further includes maintaining the thermal engine in an inoperative state.

5. The method of claim 1, wherein the thermal engine of the hybrid aircraft power plant is coupled to the clutch via reduction gearing, wherein the first mode further includes the first lubricant pump circulating lubricant to the thermal engine and to the reduction gearing, wherein the second mode further includes neither the first lubricant pump nor the second lubricant pump circulating the lubricant, neither to the thermal engine nor to the reduction gearing.

6. The method of claim 1, wherein the first mode further includes the first lubricant pump circulating a lubricant to the clutch, wherein the second mode further includes the second lubricant pump circulating the lubricant to the clutch.

7. The method of claim 1, therein the hybrid aircraft power plant further has at least one of a heat exchanger, an inverter and a controller associated to the electric motor, wherein the first mode further includes the first lubricant pump circulating lubricant to the at least one of the heat exchanger, the inverter and the controller, wherein the second mode further includes the second lubricant pump circulating lubricant to the at least one of the heat exchanger, the inverter and the controller.

* * * * *